United States Patent [19]
Kuroda et al.

[11] Patent Number: 5,769,129
[45] Date of Patent: Jun. 23, 1998

[54] COLD-AND HOT-WATER SUPPLY COPPER-ALLOY PIPE WITH INNER-SURFACE PROTECTIVE FILM, METHOD FOR MANUFACTURING SAME, AND HOT-WATER SUPPLY HEAT EXCHANGER

[75] Inventors: Taro Kuroda; Motohisa Miyafuji; Kenju Minamoto, all of Yamaguchi-ken, Japan

[73] Assignee: Kabushiki Kaisha Kobe Seiko Sho, Kobe, Japan

[21] Appl. No.: 737,341

[22] PCT Filed: Mar. 16, 1995

[86] PCT No.: PCT/JP95/00447

§ 371 Date: Feb. 10, 1997

§ 102(e) Date: Feb. 10, 1997

[87] PCT Pub. No.: WO96/28686

PCT Pub. Date: Sep. 19, 1996

[51] Int. Cl.[6] ........................................................ F16L 9/14
[52] U.S. Cl. ............................ 138/143; 138/38; 138/146
[58] Field of Search .............................. 138/38, 139, 141, 138/142, 143, 146, 172

[56] References Cited

U.S. PATENT DOCUMENTS

| 4,217,886 | 8/1980 | McLaughlin | 138/143 |
| 4,337,793 | 7/1982 | Sato et al. | 138/177 |

FOREIGN PATENT DOCUMENTS

| 53-62742 | 6/1978 | Japan . |
| 57-137445 | 8/1982 | Japan . |
| 57-207139 | 12/1982 | Japan . |
| 4-45282 | 3/1992 | Japan . |

Primary Examiner—David Scherbel
Assistant Examiner—James F. Hook
Attorney, Agent, or Firm—Oblon, Spivak, McClelland, Maier & Neustadt, P.C.

[57] ABSTRACT

A cold- and hot-water supply copper alloy pipe with an inner-surface protective film is provided. A pipe body is made of a copper alloy which consists essentially of at least one of Zn and Mn by 0.02 wt % or more as the total amount, Zn being restricted to 5 wt % or less and Mn being restricted to 3 wt % or less and balance being copper and inevitable impurities. A protective film is formed on the inner surface of the copper alloy pipe body and made of Sn and inevitable impurities. The protective film has an average thickness of 0.2 to 4 μm in the pipe circumferential direction. The protective film can be made of Sn, an intermetallic compound of Sn and Cu, and inevitable impurities or made of an intermetallic compound of Sn an Cu and inevitable impurities. In any case, $Cu_3Sn$ must not present on the surface of the protective film. This type of copper alloy pipe makes it possible to prevent an ε phase which causes pitting from forming on the surface of the protective film, prevent copper ions from being eluted, and improve the pitting resistance.

20 Claims, No Drawings

COLD-AND HOT-WATER SUPPLY COPPER-ALLOY PIPE WITH INNER-SURFACE PROTECTIVE FILM, METHOD FOR MANUFACTURING SAME, AND HOT-WATER SUPPLY HEAT EXCHANGER

TECHNICAL FIELD

The present invention relates to a copper-alloy pipe whose inner surface is plated with Sn as an inner-surface protective film and which is used for a cold- and hot-water supply pipe, a method for manufacturing the pipe, and a heat exchanger using the copper-alloy pipe and used for a business- or home-use hot-water supply system in which copper ions are prevented from being eluted and the pitting resistance is improved.

BACKGROUND ART

A copper pipe, a galvanized steel pipe, a vinyl chloride pipe, a stainless steel pipe, or a vinyl-chloride-lining steel pipe is used as a conventional cold- and hot-water supply pipe. Among these types of pipes, the copper pipe is particularly superior in the practicedness and corrosion resistance and has an advantage that even a long copper pipe can be easily transported, because the copper tube can be coiled. Therefore, the copper pipe is widely used as a cold- and hot-water supply pipe.

A phosphorus deoxidation copper (JIS H3300C1220T) pipe is mainly used as a heat-transfer pipe for heat exchanger incorporated into a conventional hot-water supply system. The phosphorus deoxidation copper pipe is superior in the heat transfer characteristic and corrosion resistance and widely used as this type of the heat transfer pipe.

In a heat exchanger using a phosphorus deoxidation pipe, however, copper ions are eluted from the pipe wall and the copper ion concentration of clean water may exceed 1 ppm which is the criterion of the quality of clean water with a legally-specified copper ion concentration for a certain type of water such as water with a low pH or water with a lot of free carbon dioxide. Even if the copper ion concentration is 1 ppm or lower, a white cloth may be blued. Therefore, it is preferable to decrease the elution of copper ions into water. As means for preventing the copper ion elution, chemicals have been added to supplied water, a copper-ion elution preventive alloy has been developed, or the inner surface of a pipe has been coated so far. Though addition of chemicals to supplied water is effective to prevent copper ions from being eluted, it is not practical because the pipe manufacturing cost increases.

As for the problem of copper ion elution, it is proposed to use a Cu—Mg or Cu—Ca type copper-ion-elution preventive alloy (Japanese Patent No. 964347) for a cold- and hot-water supply pipe, and therefore it is considered to use the alloy as the material of a heat exchanger in a hot-water supply system. However, the alloy is not practical because the alloy is not only difficult to cast the ingot but also the alloy does not have a high copper-ion elution preventive effect.

Moreover, an art for plating the inner surface of a copper pipe with Sn has generally been known as a means for preventing copper ion elution (H. H. UHLIG (transliterated), "Corrosion and Corrosion Control—Theory and Application", SANGYO TOSHO (transliterated)(1968), p. 275) and many Sn coating methods are proposed.

That is, the following methods are generally known as methods for manufacturing a pipe whose inner surface is coated: a method having a step of applying metallic powder with a low melting point and flux to the inner surface of the copper pipe and a step of heating it (Japanese Patent Laid-Open Nos. 200954/1985, 200975/1985, 61717/1987, and 61718/1987), a method having a step of forming a Cu—Sn alloy film on the inner surface of the copper pipe (Japanese Patent Laid-Open No. 221359/1986), and a method having a step of hot-dipping on the inner surface of the copper pipe (Japanese Patent Laid-Open No. 61716/1986). However, these methods cannot be applied to a pipe with a length larger than its diameter though it can be applied to a pipe with a length smaller than its diameter.

Therefore, to solve these problems of a conventional method for coating a protective film on an inner-surface of a pipe, a pipe inner-surface coating method is proposed which applies electroless tin plating to the inner surface of a copper pipe (Japanese Patent Laid-Open Nos. 45282/1992 and 99180/1992).

This method of applying electroless tin plating to the inner surface of a copper pipe has the advantages that the method decreases the manufacturing cost, and moreover it can be applied to a pipe with a length larger than its diameter and particularly, the method makes it possible to coat a coiled copper pipe. Therefore, the method is a very useful art. Moreover, the conventional electroless tin plating method shows corrosion resistance against the pitting which is a problem of a conventional Sn-coated copper pipe.

However, when the conventional copper pipe to which the electroless tin plating is applied is used as a cold- and hot-water supply pipe, a problem occurs that the corrosion potential on the surface of the pipe slowly rises, then exceeds the corrosion potential of the base material, and finally causes the dangerousness of pitting to rise.

The cause of the above problem is considered as shown below. That is, in the beginning of use of the pipe, the corrosion potential of the surface of the pipe does not exceed that of the base material because Sn is present on the surface of the pipe. However, as time passes, diffusion progresses between the Sn plating layer and the Cu base material of the pipe body, an $\epsilon$ phase ($Cu_3Sn$ phase) of a Cu—Sn intermetallic compound grows, and the $\epsilon$ phase reaches up to the surface of the pipe. Because the $\epsilon$ phase forms an oxide film, the corrosion potential of which being higher than that of the base material, the base material may be pitted if a missing portion (e.g. pinhole or scratch) is present on the $\epsilon$ phase. This phenomenon becomes more remarkable as the operating temperature rises and may early occurs under a hot-water supply condition in which hot water close to 100° C. is used.

Moreover, even if a heat exchanger for a hot-water supply system is assembled by using the above prior arts and using a conventional copper pipe whose inner surface is plated with Sn, the Sn plating completely dissolves in the base material due to in-furnace brazing which may be formed in the assembling process. Therefore, Sn plating is not an effective means for preventing copper ion elution.

It is an object of the present invention to provide a cold- and hot-water supply copper alloy pipe with an inner-surface protective film, wherein an $\epsilon$ phase which is the cause of the pitting corrosion is prevented from precipitating on the surface of the protective film, thereby preventing the elution of copper ion and improving the pitting corrosion resistance, also to provide a method for manufacturing the pipe, and a heat exchanger for a hot-water supply system.

DISCLOSURE OF THE INVENTION

The cold- and hot-water supply copper alloy pipe with an inner-surface protective film according to the present invention, comprises a pipe body made of a copper alloy which consisting essentially of at least one of Zn and Mn by 0.02 wt % or more as the total amount, Zn being restricted to 5 wt % or less and Mn being restricted to 3 wt % or less, and balance being copper and an inevitable impurities; and a protective film which is formed on the inner surface of the copper alloy pipe body and made of Sn and inevitable impurities.

The protective film can be a film made of Sn, an intermetallic compound of Sn and Cu, and inevitable impurities. In this case, however, $Cu_3Sn$ must not substantially be present on the surface of the protective film.

Moreover, the protective film can be a film made of an intermetallic compound of Sn and Cu and inevitable impurities. Also in this case, $Cu_3Sn$ must not substantially be present on the surface of the protective film.

Furthermore, the copper alloy pipe body can contain at least one element selected from a group of elements P, B, Mg, and Si by 0.20 wt % or less as the total amount.

Furthermore, the copper alloy pipe body can contain at least one element selected from a group of elements Al, Sn, and Ni by 2 wt % or less as the total amount.

Furthermore, it is preferable that the average thickness of the protective film in the pipe circumferential direction ranges from 0.2 to 4 $\mu$m.

The method for manufacturing a cold- and hot-water supply copper alloy pipe with an inner-surface protective film according to the present invention, comprises the steps of forming a Sn plating layer on the inner surface of a pipe body made of a copper alloy which consists essentially of at least one of Zn and Mn by 0.02 wt % or more as the total amount, Zn being restricted to 5 wt % or less and Mn being restricted to 3 wt % or less, and the balance being copper and an inevitable impurities.

In this case, $Cu_3Sn$ is an $\epsilon$ phase and $Cu_6Sn_5$ is an $\eta$ phase.

Moreover, in the heat exchanger for a hot-water supply system according to the present invention, comprises a heat transfer fin and a heat transfer pipe, the heat transfer pipe being made of the copper alloy pipe with a protective film according to claims 1 to 6.

BEST MODE FOR CARRYING OUT THE INVENTION

The present inventors performed various experiments and researches to examine the cause of the pitting and as a result, the present inventors found that an $\epsilon$ ($Cu_3Sn$) phase of a Cu—Sn intermetallic compound grew at the boundary between the base material and the Sn-plating layer, because a heat exchanger pipe in a hot-water supply system was operated at a high temperature and thereby, diffusion was progressed between the base material and the Sn plating layer. Because the corrosion potential of the $\epsilon$ phase is higher than that of copper of a base material, the possibility of causing the pitting gets high when the corrosion potential of the surface of the pipe becomes higher than that of the base material of the pipe according to use of the pipe, even if Sn plating is applied to the heat exchanger for a hot-water supply system after it is assembled.

Moreover, the present inventors performed various researches and found that there was no possibility of pitting even if an $\eta$ phase is formed on the surface of an Sn plating layer (inner surface of the copper pipe) unless the $\epsilon$ phase is formed on the surface. Furthermore, they found that, in order to restrain the formation of the $\epsilon$ phase, it was necessary to prevent Cu from diffusing in the Sn plating layer toward the surface of the layer and, in order to prevent the Cu diffusion, it was necessary to add Zn or Mn into the copper-alloy base material. Thereby, the possibility of pitting is dissolved even under a hot-water supply condition in which temperature rises during operation.

The present invention is completed in accordance with the above knowledge. By plating the inner surface of a copper alloy pipe with Sn by the electroless plating method, an intermetallic compound of Cu and Sn is produced at the interface between the Sn plating protective layer and the copper alloy pipe body as time passes. Therefore, the protective layer formed by plating the inner surface of the copper alloy pipe body with Sn changes from a state in which only Sn is present to a state in which Sn, $Cu_3Sn$ ($\epsilon$ phase), and $Cu_6Sn_5$ ($\eta$ phase) are present. Therefore, even under the state in which the $\epsilon$ phase and $\eta$ phase are present in addition to Sn, there is the effect of preventing pitting. However, as described above, when the $\epsilon$ phase is formed on the surface of the protective film, pitting occurs. Therefore, it is necessary to prevent the $\epsilon$ phase from forming on the surface of the protective film.

Reasons of limiting constituents specified in the present invention are described below.

Zn and Mn Alloy Elements in Copper Alloy Base Material of Pipe Body

It is necessary to contain Zn or Mn individually or both Zn and Mn by 0.02 wt % or more as the total amount in a copper alloy. Thereby, an $\epsilon$ phase is restrained from growing. In this case, to obtain the $\epsilon$-phase growth restraining effect, it is necessary to add Zn and/or Mn by 0.02 wt % or more as the total amount and it is more preferable to add Zn and/or Mn by 0.05 wt % as the total amount.

However, when the content of Zn exceeds 5 wt %, the possibility of stress corrosion crack increases. When the content of Mn exceeds 3 wt %, the copper alloy cannot practically be used as a pipe material because the bending property is deteriorated. Therefore, it is necessary to set the content of Zn to 5 wt % or less and that of Mn to 3 wt % or less.

At Least One Element Selected From a Group of Elements P, B, Mg, and Si Must be Contained in Copper-Alloy Base Material by 0.20 wt % or Less as the Total Amount It is possible to add P, B, Mg, and Si to the copper alloy as deoxidation materials or as elements for improving the strength. However, if the content of those elements exceeds 0.20 wt % as the total amount, it is necessary to add these components by 0.20 wt % or less as the total amount.

At Least one Element Selected From a Group of Elements Al, Sn, and Ni Must be Contained in the Copper Alloy Base Material by 2.0 wt % or Less as the Total Amount It is possible to add Al, Sn, and Ni to a copper alloy pipe in order to increase the strength, heat resistance, and corrosion resistance of the pipe. However, if the copper alloy contains them by more than 2.0 wt %, those effects are saturated and moreover the manufacturing cost increases. Therefore, it is necessary to set the content of these elements to be added to 2.0 wt % or less as the total amount.

An $\epsilon$ Phase Must Not be Formed on the Surface of a Protective Film

When the $\epsilon$ phase appears on the surface of the film, it is oxidized by oxygen dissolved in supplied cold or hot water, the corrosion potential gets extremely high relative to the base material, and the possibility of pitting increases. Therefore, it is necessary to prevent the ϵ phase from forming on the surface of the protective film.

The Thickness of the Protective Film Must be Kept Between 0.2 and 4 μm

When the thickness of the protective film comes to less than 0.2 μm, eluted amount of copper ions suddenly increases and moreover, the protective film cannot withstand the physical peeling action. Moreover, when the thickness of the protective film exceeds 4 μm, the protective-film forming cost increases. Therefore, it is preferable to keep the thickness of the protective film between 0.2 and 4 μm.

Then, embodiments of the present invention are described below in comparison with their comparative examples. A copper-ion elution test, ϵ-phase growth acceleration test, corrosion test, hot-working property test, bending property test, and stress corrosion cracking property test were performed by using the plating solutions shown in Table 1 below and pipes having the compositions shown in Tables 2 and 3. Methods for evaluating the above characteristics are shown below.

Hot-Working Property

A drop-hammer testing specimen with a diameter of 15 mm and a length of 15 mm is sampled out of each alloy casting ingot and a drop hammer test at a deformation rate of 50% at 850° C. was applied to the specimen to check if the specimen was cracked.

Bending Property

Each alloy pipe (outside diameter of 15.88 mm and wall thickness of 0.71 mm) was bent and a bending test at a bending pitch of 50 mm was applied to each pipe to check if the bent portion was creased or broken.

Stress Corrosion Cracking Property

A stress of 80% of proof stress was applied to each alloy pipe (outside diameter of 15.88 mm, wall thickness of 0.71 mm, and length of 100 mm) and the alloy pipe was set in a desiccator storing 12% aqueous ammonia by separating the pipe from the aqueous ammonia surface by 50 mm and exposed to ammonia gas at room temperature for 2 hr to check if the pipe was cracked.

ϵ Phase Growth Restraint

A plating with a thickness of 1.5 μm was formed on each alloy pipe (outside diameter of 15.88, wall thickness of 0.71 mm, and length of 100 mm) by flowing the plating solution shown in the following Table 1 through the pipe and thereafter, the pipe was heated at 100° C. for 900 hr to apply a ϵ-phase growth acceleration test to the pipe and measure the thickness of the ϵ phase by observing the cross section the pipe with a scanning electron microscope.

Corrosion Test and Copper Ion Elution Test

Plating was applied to each alloy pipe (outside diameter of 15.88 mm, wall thickness of 0.71 mm, and length of 500 mm) by flowing the plating solution shown in the following Table 1 and thereafter, the pipe was heated to control a protective film. Then the eluted amounts of copper ions were measured by the atomic absorption method after 24 hours passed from the time when the pipe was filled with tap water. Thereafter, it was checked if the pipe was pitted after flowing tap water through the pipe for one year (400 liter/day).

TABLE 1

| No. | Type of plating | Composition of plating solution | |
|---|---|---|---|
| 1 | Substitutional electroless plating solution | Tin(II) chloride<br>Sodium cyanide<br>Sodium hydroxide | 20 g/lit<br>188 g/lit<br>25 g/lit |
| 2 | Substitutional electroless plating solution | Tin(II) chloride<br>Thiourea<br>Tartaric acid | 5 g/lit<br>55 g/lit<br>40 g/lit |
| 3 | Reductive electroless plating solution | Sodium tartrate<br>EDTA<br>Nitryl Sodium triacetate<br>Tin(II) chloride | 3.0 mol/lit<br>0.08 mol/lit<br>0.2 mol/lit<br>0.04 mol/lit |
| 4 | Reductive electroless plating solution | Sodium tartrate<br>EDTA<br>Tin (II) sulfate<br>Nitryl sodium triacetate)<br>Titanium sulfate | 0.3 mol/lit<br>0.1 mol/lit<br>0.1 mol/lit<br>0.1 mol/lit<br>0.05 mol/lit |

TABLE 2

| Alloy No. | Cu | Zn | Mn | P | B | Mg | Si | Al | Sn | Ni |
|---|---|---|---|---|---|---|---|---|---|---|
| Examples | | | | | | | | | | |
| 1 | bal. | 0.18 | | | | | | | | |
| 2 | bal. | | 0.12 | | | | | | | |
| 3 | bal. | 3.21 | | 0.03 | | | | | | |
| 4 | bal. | | 1.66 | | 0.02 | | | | | |
| 5 | bal. | 1.13 | | | | 0.05 | | | | |
| 6 | bal. | | 2.54 | | | | 0.02 | | | |
| 7 | bal. | 0.22 | 0.13 | | | | | | | |
| 8 | bal. | 0.54 | 1.12 | 0.02 | | | | | | |
| 9 | bal. | | 0.33 | | 0.01 | | | | | |
| 10 | bal. | 0.03 | | 0.01 | | 0.01 | | | | |
| 11 | bal. | 4.86 | | | | | | 0.03 | | |
| 12 | bal. | 2.44 | | | | | | | 1.44 | |
| 13 | bal. | | 0.05 | | | | | | | 1.77 |
| 14 | bal. | 0.01 | 0.05 | | | | | | 0.30 | |
| 15 | bal. | | 0.03 | 0.02 | | | | 0.10 | | |
| 16 | bal. | 0.04 | | | | 0.009 | | | | |

TABLE 2-continued

| Alloy No. | Cu | Zn | Mn | P | B | Mg | Si | Al | Sn | Ni |
|---|---|---|---|---|---|---|---|---|---|---|
| 17 | bal. | 0.06 | | 0.006 | | | | | 0.03 | |
| 18 | bal. | 0.11 | | | | | | 0.08 | | |
| 19 | bal. | | 0.21 | 0.008 | | 0.005 | | | | |
| 20 | bal. | | 0.07 | | | | 0.01 | | | |

TABLE 3

| Alloy No. | Cu | Zn | Mn | P | B | Mg | Si | Al | Sn | Ni |
|---|---|---|---|---|---|---|---|---|---|---|
| Comparative Examples | | | | | | | | | | |
| 21 | bal. | | | | | | | | | |
| 22 | bal. | | | 0.03 | | | | | | |
| 23 | bal. | 0.01 | | | | | | | | |
| 24 | bal. | | 0.016 | | | | 0.31 | | | |
| 25 | bal. | 0.009 | | | | 0.04 | | | 0.20 | |
| 26 | bal. | 0.007 | 0.004 | | | 0.004 | | | | 0.88 |
| 27 | bal. | 5.34 | | | | 0.30 | | | | |
| 28 | bal. | 5.98 | | | | 0.10 | | | | |
| 29 | bal. | | 3.33 | | | | | | | |
| 30 | bal. | | 3.45 | | | | | 0.01 | 0.20 | |
| 31 | bal. | 6.00 | 3.89 | | 0.007 | | | | | |
| 32 | bal. | 5.99 | 3.50 | 0.24 | | | | | | |

TABLE 4

| | Alloy No. | Hot-working property | Bending property | Stress corrosion cracking property | Type of plating | ε phase thickness (μm) |
|---|---|---|---|---|---|---|
| examples | 1 | ○ | ○ | ○ | 1 | 0.20 |
| | 2 | ○ | ○ | ○ | 1 | 0.25 |
| | 3 | ○ | ○ | ○ | 1 | 0.25 |
| | 4 | ○ | ○ | ○ | 1 | 0.25 |
| | 5 | ○ | ○ | ○ | 1 | 0.25 |
| | 6 | ○ | ○ | ○ | 2 | 0.20 |
| | 7 | ○ | ○ | ○ | 2 | 0.20 |
| | 8 | ○ | ○ | ○ | 2 | 0.25 |
| | 9 | ○ | ○ | ○ | 2 | 0.25 |
| | 10 | ○ | ○ | ○ | 2 | 0.50 |
| | 11 | ○ | ○ | ○ | 3 | 0.20 |
| | 12 | ○ | ○ | ○ | 3 | 0.25 |
| | 13 | ○ | ○ | ○ | 3 | 0.30 |
| | 14 | ○ | ○ | ○ | 3 | 0.25 |
| | 15 | ○ | ○ | ○ | 3 | 0.55 |
| | 16 | ○ | ○ | ○ | 4 | 0.40 |
| | 17 | ○ | ○ | ○ | 4 | 0.25 |
| | 18 | ○ | ○ | ○ | 4 | 0.20 |
| | 19 | ○ | ○ | ○ | 4 | 0.25 |
| | 20 | ○ | ○ | ○ | 4 | 0.30 |
| Comparative examples | 21 | ○ | ○ | ○ | 1 | 1.55 |
| | 22 | ○ | ○ | ○ | 1 | 1.50 |
| | 23 | ○ | ○ | ○ | 1 | 1.20 |
| | 24 | X | ○ | ○ | 1 | 1.05 |
| | 25 | ○ | ○ | ○ | 2 | 1.35 |
| | 26 | ○ | ○ | ○ | 2 | 1.35 |
| | 27 | X | ○ | X | 2 | 0.25 |
| | 28 | ○ | ○ | X | 3 | 0.25 |
| | 29 | ○ | Δ | ○ | 3 | 0.20 |
| | 30 | ○ | X | ○ | 4 | 0.25 |
| | 31 | ○ | X | X | 4 | 0.25 |
| | 32 | X | X | X | 4 | 0.25 |

TABLE 5

| Alloy No. | Type of plating | Heat treatment | Protective film forming phase | Protective film thickness (μm) |
|---|---|---|---|---|
| 1 | 1 | no heat treatment | Sn | 1.05 |
| 2 | 1 | 100° C. × 10 hr | η | 0.95 |
| 3 | 1 | 100 24 | η | 1.35 |
| 4 | 1 | 140 3 | Sn + η | 1.20 |
| 5 | 2 | 140 3 | η + ε | 0.45 |
| 11 | 3 | 140 48 | η + ε | 1.85 |
| 12 | 3 | 160 0.5 | Sn + η | 2.45 |
| 14 | 3 | 100 1 | η | 0.30 |
| 18 | 4 | 160 3 | η + ε | 0.50 |
| 20 | 4 | no heat treatment | Sn | 0.35 |
| 1 | 1 | 100° C. × 0.5 hr | η | 0.15 |
| 2 | 1 | 140 5 | ε | 0.30 |
| 3 | 1 | 160 7 | ε | 0.50 |
| 4 | 1 | no heat treatment | Sn | 0.10 |
| 8 | 2 | 160 3 | ε | 0.10 |
| 10 | None | no plating | — | — |

TABLE 6

| Alloy No. | Maximum corrosion depth(mm) | Copper ion elution test (ppm) |
|---|---|---|
| 1 | — | <0.01 |
| 2 | — | <0.01 |
| 3 | — | <0.01 |
| 4 | — | <0.01 |
| 5 | — | <0.01 |
| 11 | — | <0.01 |
| 18 | — | <0.01 |

TABLE 6-continued

| Alloy No. | Maximum corrosion depth(mm) | Copper ion elution test (ppm) |
|---|---|---|
| 20 | — | <0.01 |
| 22 | — | <0.01 |
| 1 | — | 0.24 |
| 2 | 0.23 | <0.01 |
| 3 | | |
| 4 | — | 0.33 |
| 8 | 0.25 | 0.39 |
| 10 | — | 0.85 |

Test results of the specimens are shown in Table 4. In Table 4, symbol "o" in the column for hot-working property represents a preferable case and symbol "x" represents a case in which a crack occurs. Moreover, symbol "o" in the column for bending property represents a preferable case, symbol "Δ" represents a case in which a crease occurs, and symbol "x" represents a case in which a break occurs. Furthermore, symbol "o" in the column for stress corrosion cracking property represents a preferable case and symbol "x" represents a case in which a crack occurs. Furthermore, in Table 5, symbols in the column for type of plating in Table 5 correspond to the plating solutions shown in Table 1 respectively.

From Table 4, it is found that ε phases of the alloys of examples Nos. 1 to 20 containing a predetermined amount of Zn and/or Mn are securely restrained in ε-phase growth. Moreover, the examples containing a predetermined amount of elements such as P and Al are same as those which do not contain these elements in ε-phase growth restraint effect and superior in hot-working, bending, and stress-corrosion cracking properties. Therefore, the alloys can practically be used.

However, the comparative-examples of alloy Nos. 21 to 26 are not restrained in ε phase growth because they contain a small amount of or no Zn and/or Mn. However, the comparative-example alloy Nos. 24, 27, and 32 containing elements including P by more than 0.2 wt % as the total amount are inferior in hot-working property and the comparative-example alloy Nos. 29 to 32 containing Mn by more than 3 wt % are inferior in bending property. Moreover, the comparative-example alloy Nos. 27, 28, 31, and 32 containing Zn by more than 5 wt % cannot practically be used because a stress corrosion crack occurs in them.

Table 5 shows types of phases forming protective films and thicknesses of protective films when forming an Sn layer on the alloys having the composition shown in Table 2 by using the plating solutions shown in Table 1 and heat-treating them under the conditions shown in the column for heat treatment in Table 5. Moreover, Table 6 shows the maximum corrosion depth and the eluted amount of copper ions obtained from a corrosion test as the result of applying the corrosion test and a copper-ion elution test to the specimens.

From Table 6, it is found that pitting occurs in specimens having an ε phase on the surface and the eluted amount of copper ions increases for those with a protective-film thickness of 0.2 μm or less. Therefore, they cannot practically be used.

Then, the heat exchanger shown in Table 7 are assembled to perform a copper ion elution test and a corrosion test. The method for evaluating each characteristic is shown below.

Corrosion Test

It is checked if pitting occurs by using the heat exchanger shown in Table 7 and performing a corrosion test under the conditions below.

Heat-exchanger pipes used have an outside diameter of 12.7 mm, a wall thickness of 0.6 mm, and a length of 1 m.

[Test Water Quality]

pH=6.8 to 7.0

$HCO_3^-/SO_4^{2-}=0.6$

R-Cl (Residual chlorine)=3 ppm $SiO_2$=20 ppm

[Water Supply Conditions]

Heating: Combustion gas by a propane-gas burner

Water flow rate: 2 liter/min

Supplied water temperature

Incoming side of heat exchanger: Room temperature

Outgoing side of heat exchanger: 95° to 100° C.

Water supply time: 1 hr×4 times/day

Out of water supply time: Leaving at room temperature

[Water Supply Period]

Six months

Potential Measurement

After the above corrosion test terminates, heat exchanger are disassembled, heat-exchanger pipes are cut by 10 cm in the longitudinal direction, halved pipes of the heat-exchanger pipes are sampled, and the edge and outside of the halved pipes are sealed with silicon resin to measure the potential of the halved pipes in tap water.

Copper Ion Elution Test

While performing the above corrosion test, the heat exchanger are filled with tap water to measure the eluted amount of copper ions by the atomic absorption method after 24 hr passed from filling the tap water, at the time, before supplying water, one month after starting the corrosion test, three months after starting the corrosion test, and when the corrosion test terminates.

Measurement of Sn Plating Thickness

The Sn plating thickness is measured by an fluorescent X-ray film-thickness measuring instrument by setting a dummy pipe with the same composition as a heat transfer pipe at the front end of an assembled heat exchanger, circulating an electroless Sn plating solution through the dummy pipe to plate it with Sn, and then removing and halving the dummy pipe.

TABLE 7

| Heat exchanger | | Heat transfer pipe composition (wt %) | | | | | | Sn plating thickness |
|---|---|---|---|---|---|---|---|---|
| | No. | Cu | Zn | Mn | P | Sn | Ni | (μm) |
| Examples | 1 | bal. | 0.21 | — | 0.02 | — | — | 0.23 |
| | 2 | bal. | — | 0.66 | 0.01 | — | — | 0.79 |
| | 3 | bal. | 0.43 | 0.35 | — | 0.14 | — | 1.50 |
| | 4 | bal. | — | 1.73 | 0.03 | — | — | 2.78 |
| | 5 | bal. | 3.45 | — | — | — | 0.29 | 0.30 |
| Com | 6 | bal. | — | 0.32 | — | — | — | 0.07 |
| | 7 | bal. | — | — | 0.02 | — | — | 0.05 |
| | 8 | bal. | — | — | 0.03 | — | — | 1.02 |
| | 9 | bal. | 0.005 | — | — | — | — | 1.43 |

TABLE 8

| Heat ex-changer No. | Cu$^{2+}$ elution test (ppm) | | | | Maximum corrosion depth as the result of corrosion test (mm) | corrosion potential after termination of test (mV SCE) |
| --- | --- | --- | --- | --- | --- | --- |
| | Before water supply | One month later | Three months later | after ter-mina-tion | | |
| 1 | <0.01 | <0.01 | <0.01 | <0.01 | — | −150 |
| 2 | <0.01 | <0.01 | <0.01 | <0.01 | — | −160 |
| 3 | <0.01 | <0.01 | <0.01 | <0.01 | — | −150 |
| 4 | <0.01 | <0.01 | <0.01 | <0.01 | — | −160 |
| 5 | <0.01 | <0.01 | <0.01 | <0.01 | — | −160 |
| 6 | 0.21 | 0.34 | 0.11 | 0.10 | — | −160 |
| 7 | 0.33 | 0.47 | 0.13 | 0.15 | 0.24 | +140 |
| 8 | <0.01 | <0.01 | <0.01 | <0.01 | 0.27 | +130 |
| 9 | <0.01 | <0.01 | <0.01 | <0.01 | 0.10 | +70 |

In the corrosion test, symbol "−" represents a case in which no pitting occurs.

From Table 8, it is found that a heat exchanger using a heat transfer pipe containing a predetermined amount of Zn and Mn is securely restrained in pitting. However, because comparative-example heat exchanger Nos. 7, 8, and 9 do not contain Zn and Mn or contain a small amount of Zn or Mn, pitting occurs in them and the corrosion potential of them after the test becomes extremely high.

Moreover, for a plating thickness of less than 0.1 μm, copper ions are eluted. For a plating thickness of 0.1 μm or more, however, no copper ion is eluted even after time passes.

Industrial Applicability

The cold- and hot-water supply copper alloy pipe with a protective film according to the present invention is very useful as a copper alloy pipe used for a cold- and hot-water supply pipe in the architectural field because not only the pipe is superior in the copper ion elution preventive effect but also it does not cause pitting even under a high temperature and makes it possible to greatly improve the reliability and service life of a hot-water supply system.

We claim:

1. A cold- and hot-water supply copper alloy pipe with an inner-surface protective film, comprising a pipe body made of a copper alloy which consists essentially of at least one of Zn and Mn by 0.02 wt % or more as the total amount, Zn being restricted to 5 wt % or less and Mn being restricted to 3 wt % or less, and balance being copper, whereby formation of ε phase in said protective film is restrained; and said protective film formed on the inner surface of the copper alloy pipe body and consisting essentially of Sn.

2. The cold- and hot-water supply copper alloy pipe with an inner-surface protective film, according to claim 1, wherein the copper alloy pipe body contains at least one element selected from a group of elements P, B, Mg, and Si by 0.20 wt % or less as the total amount.

3. The cold- and hot-water supply copper alloy pipe with an inner-surface protective film, according to claim 1; wherein the copper alloy pipe body contains at least one element selected from a group of elements Al, Sn, and Ni by 2 wt % or less as the total amount.

4. The cold- and hot-water supply copper alloy pipe with an inner-surface protective film, according to claim 1; wherein the protective film has an average thickness of 0.2 to 4 μm in the pipe circumferential direction.

5. A heat exchanger for a hot-water supply system, comprising a heat transfer pipe made of the copper alloy pipe according to claim 1 and a heat transfer fin.

6. The pipe of claim 1, wherein said copper alloy further consists essentially of impurities.

7. The pipe of claim 1, wherein said copper alloy consists essentially of at least one of Zn and Mn by 0.05 wt. % or more as the total amount.

8. A cold- and hot-water supply copper alloy pipe with an inner-surface protective film, comprising a pipe body made of a copper alloy which consists essentially of at least one of Zn and Mn by 0.02 wt % or more as the total amount, Zn being restricted to 5 wt % or less and Mn being restricted to 3 wt % or less, and balance being copper, whereby formation of ε phase in said protective film is restrained; and said protective film formed on the inner surface of the copper alloy pipe body and consisting essentially of Sn, and an intermetallic compound of Sn and Cu; wherein $Cu_3Sn$ is not substantially present on the surface of the protective film.

9. A heat exchanger for a hot-water supply system, comprising a heat transfer pipe made of the copper alloy pipe according to claim 8 and a heat transfer fin.

10. The pipe of claim 8, wherein said copper alloy further consists essentially of impurities.

11. The pipe of claim 8, wherein said copper alloy consists essentially of at least one of Zn and Mn by 0.05 wt. % or more as the total amount.

12. The pipe of claim 8, wherein said protective film further consists essentially of impurities.

13. A cold- and hot-water supply copper alloy pipe with an inner-surface protective film, comprising a pipe body made of a copper alloy which consists essentially of at least one of Zn and Mn by 0.02 wt % or more as the total amount, Zn being restricted to 5 wt % or less and Mn being restricted to 3 wt % or less, and balance being copper, whereby formation of ε phase in said protective film is restrained; and said protective film formed on the inner surface of the copper alloy pipe body and consisting essentially of an intermetallic compound of Sn and Cu; wherein $Cu_3Sn$ is not substantially present on the surface of the protective film.

14. A heat exchanger for a hot-water supply system, comprising a heat transfer pipe made of the copper alloy pipe according to claim 13 and a heat transfer fin.

15. The pipe of claim 13, wherein said copper alloy further consists essentially of impurities.

16. The pipe of claim 13, wherein said copper alloy consists essentially of at least one of Zn and Mn by 0.05 wt. % or more as the total amount.

17. The pipe of claim 13, wherein said protective film further consists essentially of impurities.

18. A method for manufacturing a cold- and hot-water supply copper alloy pipe with an inner-surface protective film, comprising the steps of forming an Sn plating layer on the inner surface of a pipe body made of a copper alloy which consists essentially of at least one of Zn and Mn by 0.02 wt % or more as the total amount, Zn being restricted to 5 wt % or less and Mn being restricted to 3 wt % or less and balance being copper, wherein formation of ε phase in said Sn plating layer is restrained.

19. The method of claim 18, wherein said copper alloy further consists essentially of impurities.

20. The method of claim 18, wherein said copper alloy consists essentially of at least one of Zn and Mn by 0.05 wt. % or more as the total amount.

* * * * *